United States Patent [19]

Wagner et al.

[11] Patent Number: 4,811,200
[45] Date of Patent: Mar. 7, 1989

[54] MULTIPLE MICROPROCESSOR WATCHDOG SYSTEM

[75] Inventors: David J. Wagner, Lake Zurich; Dean M. Picha; Stephen G. Oller, both of Schaumburg, all of Ill.; Robert J. Laping, Newport Beach, Calif.

[73] Assignee: Motorola, Inc., Schaumburg, Ill.

[21] Appl. No.: 49,769

[22] Filed: May 12, 1987

[51] Int. Cl.[4] .................. G06F 11/00; G06F 11/28; G06F 11/32/11/30
[52] U.S. Cl. ................................ 364/200; 371/62
[58] Field of Search ... 364/200 MS File, 900 MS File; 371/62

[56] References Cited

U.S. PATENT DOCUMENTS

| 4,429,366 | 1/1984 | Kennon | 364/482 |
|---|---|---|---|
| 4,443,849 | 4/1984 | Ohwada | 364/200 |
| 4,558,416 | 12/1985 | Pauwels et al. | 364/431.11 |
| 4,597,052 | 6/1986 | Matsuda | 364/550 |
| 4,598,356 | 7/1986 | Dean et al. | 364/200 |
| 4,674,035 | 6/1987 | Engel | 364/200 |
| 4,683,568 | 7/1987 | Urban | 371/12 |
| 4,689,766 | 8/1987 | Kent | 364/900 |
| 4,696,002 | 9/1987 | Schleupen et al. | 371/12 |
| 4,726,024 | 2/1988 | Guziak et al. | 371/16 |

Primary Examiner—Archie E. Williams, Jr.
Assistant Examiner—Ayni Mohamed
Attorney, Agent, or Firm—Phillip H. Melamed

[57] ABSTRACT

A main microprocessor A (11) provides data to a display formatter microprocessor B (12) via a data bus (13). Microprocessor B provides data and latch (activity) pulses (34A) to a visual display (27) comprising a number of individual display devices (28-30) which are sequentially excited by data obtained from microprocessor B. An external activity detector (38), in response to an absence of the latch pulses of microprocessor B for a predetermined time, generates a reset signal (40) for resetting the microprocessor A. In response to being reset, microprocessor A provides an output control signal (at 20) which results in the resetting of the microprocessor B. If microprocessor B determines that microprocessor A is not properly providing data to it, microprocessor B will terminate generating the latch pulses (34A). The preceding configuration results in each of the microprocessors effectively monitoring the operation of the other microprocessor so as to insure proper system operation. Therefore, this system properly resets itself in response to any of a large number of different failures which may occur in either of the microprocessors, and this is accomplished with a minimum of additional hardware circuitry and software programming.

13 Claims, 3 Drawing Sheets

MULTIPLE MICROPROCESSOR WATCHDOG SYSTEM

BACKGROUND OF THE INVENTION

The invention relates generally to the field of multiple microprocessor watchdog systems in which software and/or hardware is provided to monitor system operation and implement microprocessor resets in the event of improper system operation.

In prior microprocessor systems, it is known to have an external watchdog or activity detector circuit which monitors an output of a microprocessor and resets the microprocessor if improper microprocessor operation is determined. Typically the watchdog, or activity detector, circuit makes this determination by noting that the microprocessor has not produced an expected output within a predetermined time interval. Such watchdog circuits are known and commonly utilized to reset a microprocessor when the microprocessor has failed to produce an expected output.

In some prior systems, it is desirable to utilize two separate microprocessors, with one of them comprising a main microprocessor performing a number of complex time-consuming functions, and another comprising a less complex microprocessor performing relatively simple functions while receiving and processing output information supplied by the main microprocessor. Such systems can be utilized in providing a visual display output. In these systems the main microprocessor receives a number of sensor inputs, and provides a number of various outputs, as well as a stream of data to a second microprocessor. The second microprocessor formats the data of the first microprocessor and provides the formatted data to a visual display device In such systems, two microprocessors are utilized because the formatting task, while relatively straightforward, cannot be included in the main microprocessor program without unduly slowing down the operation of the main microprocessor. Thus, two microprocessors are utilized.

In multiple microprocessor systems such as those discussed above, it would be desirable to monitor the operation of each of the microprocessors and generate resets for these microprocessors in response to various failure modes. Of course, each microprocessor could utilize its own separate watchdog circuit to monitor the output of that microprocessor, but this would be a costly alternative, and would not insure proper synchronous operation of the microprocessors when one of the microprocessors was reset, but the other was not. In some multiple microprocessor systems, it has been proposed to utilize a single watchdog or activity detector to essentially monitor the operation of an initial microprocessor which provides data to a subsequent microprocessor. In such a system, each of the microprocessors was reset by a single external watchdog circuit monitoring an output of the initial microprocessor. In addition, the initial microprocessor could also separately reset the subsequent microprocessor under some conditions. However, in such a system, the operation of the subsequent microprocessor was not monitored, and some failures in the operation of the subsequent microprocessor would not result in a resetting of the system while insuring proper synchronous operation of the initial and subsequent microprocessors after reset.

SUMMARY OF THE INVENTION

An object of the present invention is to provide an improved multiple microprocessor watchdog system.

A more particular object of the present invention is to provide such an improved multiple microprocessor watchdog system for use in providing a visual display of data wherein a single watchdog circuit can essentially monitor the operation of both an initial and subsequent microprocessor and reset the entire system in response to detected improper operation of either of the microprocessors.

In one embodiment of the present invention, a multiple microprocessor watchdog system is provided. The watchdog system includes: first microprocessor A for generating output data on a first data bus and having an input reset terminal and an output control terminal, a control signal being provided at said output control terminal by the microprocessor A in response to the microprocessor A being reset; second microprocessor B coupled to the microprocessor A for receiving the data on the first bus, processing the data and providing the processed data on a second data bus, the microprocessor B having a reset input terminal, the microprocessor B also having an activity output terminal at which pulses are periodically provided by the microprocessor B, the existence of the pulses being indicative of proper operation of the microprocessor B; utilization apparatus coupled to the microprocessor B for receiving and utilizing the processed data on the second data bus; and an activity detector coupled to the activity output terminal of the microprocessor B for receiving the periodic pulses and providing a reset signal at an output terminal of the activity detector in response to an absence of the periodic pulses; the improvement comprising, the reset output terminal of the activity detector being effectively connected to the reset input terminal of microprocessor A, and the control output terminal of microprocessor A being connected to the reset input terminal of microprocessor B, wherein detected activity failures of microprocessor B result in resetting of microprocessor A and microprocessor B.

Basically, the microprocessor A includes a main microprocessor which receives input data, performs a number of very complex functions and provides a number of output signals. In addition, the main microprocessor A provides data to a display formatter microprocessor B which formats the received data information and provides it to a visual display module which includes a number of individual display devices, preferably vacuum fluorescent display devices. The display devices are essentially excited in a multiplex manner such that the data received by the display module is multiplexed sequentially to various ones of the display devices in accordance with multiplex data provided by the display formatter microprocessor B. The multiplex data provided by the microprocessor B is latched by latch pulses for every new data stream, and these latch pulses are also provided as an input to an activity detector which serves as a watchdog circuit. In response to an absence of these expected latch pulses, the activity detector provides a reset pulse to the reset terminal of the main microprocessor, and this therefore implements a reset mode of the main microprocessor A. During this reset mode, the main microprocessor A provides a control output which implements the resetting of the display formatter microprocessor B, and therefore the entire multiple microprocessor system is reset in response to an absence of latch pulses produced by microprocessor B.

In addition, microprocessor B, due to internal programming, can determine when data is not being transferred to it by the main microprocessor A. In such a case, the microprocessor B will respond by terminating its generation of periodic latching pulses. This, as can be seen from the preceding explanation, will result in a resetting of the entire system which includes the microprocessors A and B. Because of this configuration, the proper synchronous operation of the microprocessors A and B is maintained and failure modes in both microprocessors A and B are detectable by a single activity (watchdog) detector which resets the entire system in response to detected improper system operation. In addition, since the activity detector is responsive to the latch pulses utilized by the display module, there is no requirement for generating additional signals for the activity detector to be responsive to.

A blanker circuit is provided in the display module which, in response to an absence of latch signals for a predetermined time, results in providing a blank visual display during the resetting of microprocessors A and B. In addition, the control output provided by the microprocessor A resets microprocessor B, and releases this microprocessor for normal operation only after the completion of the reset mode of microprocessor A. This insures sequential resetting and synchronous operation of microprocessors A and B and insures that microprocessor B will not respond to data transients produced during the resetting of microprocessor A. Since it is contemplated that resetting of the system occurs for each application of power to microprocessor A, this minimizes any flickering of the visual display due to power supply transient signals.

The above-noted advantages and operation of the present invention, as well as additional advantages, are more fully explained in the subsequent description of the present invention.

BRIEF DESCRIPTION OF THE DRAWINGS

For a more complete understanding of the present invention, reference should be made to the drawings, in which.

DESCRIPTION OF THE PREFERRED EMBODIMENTS OF THE INVENTION

Figure 1:
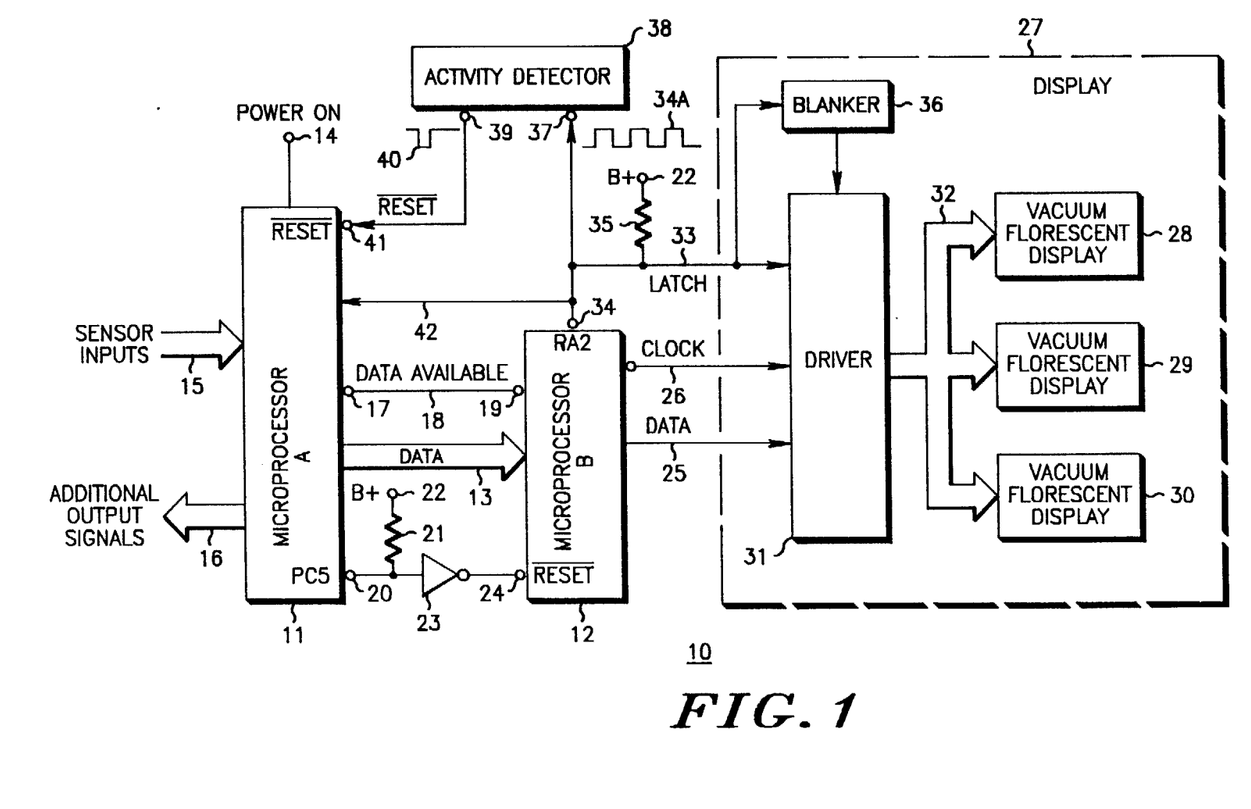
FIG. 1 comprises a schematic block diagram illustrating a multiple microprocessor watchdog system constructed in accordance with the present invention.

Referring to FIG. 1, a multiple microprocessor watchdog system 10 is illustrated which includes a main or initial microprocessor A, identified by reference numeral 11, and a subsequent data formatter microprocessor B, identified by reference numeral 12. Data is sent from microprocessor A to microprocessor B via a first data bus 13. The microprocessor A receives operative power from a power-on terminal 14, and also receives various sensor inputs via a data bus 15. In response to these sensor inputs, the microprocessor A performs a number of complex and time-consuming functions and, in addition to the data provided on the bus 13 to the microprocessor B, also provides a number of additional output signals on a data bus or a plurality of output connections 16.

The present multiple microprocessor watchdog system 10 preferably comprises a vehicle instrument cluster drive system in which various vehicle sensor inputs are provided via the bus 15, and a number of control and alert outputs are provided via the bus or output connections 16. Thus, for example, engine speed, coolant temperature, oil pressure and charging system voltage could correspond to sensor input signals provided on the bus 15, and various audio and visual alert signals, as well as engine control signals, could be provided on the output bus 16. It is contemplated that the data on the first data bus 13 will correspond to data to be displayed on a visual display on the vehicle dashboard and will be transmitted to the microprocessor B. This data will be transferred to the microprocessor B at predetermined times and will be determined by the sensor input signals on the bus 15.

When the microprocessor A is ready to send data to the microprocessor B via bus 13, the microprocessor A provides a high logic state at a terminal 17 which is connected, via a data available line connection 18, to an input terminal 19 of the microprocessor B. A high logic state on the data available line 18 tells the microprocessor B that data is available for transmission to it from the microprocessor A. In response to a transition from a high to a low logic state on the line 18, the microprocessor B will receive (read) data from the microprocessor A via the data bus 13.

The microprocessor A has an output terminal 20 which is connected to an internal port PC5 of the microprocessor. The terminal 20 corresponds to an output control terminal of the microprocessor A at which a logic signal will be provided which will reset the microprocessor B. The terminal 20 is connected through a resistor 21 to a terminal 22 at which a positive voltage potential B+ is maintained. The terminal 20 is connected through an inverter 23 to a terminal 24 corresponding to the negative reset port of the microprocessor B. In response to a high logic state at the terminal 20, the microprocessor B will be reset, but the microprocessor B will not be released to implement normal operation until termination of the high logic state at the terminal 20. Thus, the microprocessor A controls the resetting and release of the microprocessor B in accordance with the programming of microprocessor A.

The microprocessor B receives the data on the data bus 13 which is to be visually displayed. It then formats this data in a predetermined manner and transmits the formatted data via a second data bus 25 and a clock connection line 26 associated with the data on bus 25 to a visual display 27 shown dashed in FIG. 1. The display 27 comprises a number of individual vacuum fluorescent display devices 28 through 30. Actually, the data bus 25 and clock line 26 are received by a display driver 31 included within the visual display 27. The display driver processes the information on the clock line 26 and data bus 25 and sequentially provides this data in appropriate form for exciting the display devices 28 through 30 via a display bus 32. It is contemplated that the visual display 27 will excite the display devices 28-30 in essentially a periodic strobed multiplex manner. Thus data received by the display driver 31 will first be utilized to excite a first portion of the display devices 28-30, then subsequent data will be received by the display driver 31 to excite a second portion of the display devices 28 through 30, and finally additional data received by the display driver will be utilized to excite a third portion of the display devices 28 through 30. The process then continues to repeat itself. This corresponds to standard multiplexing or strobing of the display devices 28 through 30, wherein it is understood that this excitation occurs at a sufficiently rapid rate such that it appears to the human eye that the display devices 28 through 30 are constantly excited.

The strobing of the display devices 28 through 30 occurs in accordance with latch pulses provided to the display driver 31 via a latch line 33 connected between the display driver 31 and an activity output terminal 34 corresponding to an internal port RA2 of the microprocessor B. The terminal 34 is connected through a resistor 35 to the source of positive voltage potential B+ at the terminal 22. The latch pulses are also connected to blanker circuit 36. When the latch line 33 is at a high logic level, the blanker circuit 36 will cause the display to assume a blank state. The microprocessor B will produce latch or activity pulses 34A at the terminal 34 as long as the microprocessor B is operating properly, and these pulses will be utilized by the display driver to insure the proper storage of the display information to be provided to the appropriate portions of the display devices 28 through 30. If the microprocessor B fails to produce latch or activity pulses at the terminal 34, a constant logic state will be provided on the latch line 33. In response to a constant high logic signal on the line 33, as opposed to alternate high and low pulses corresponding to the activity pulses 34A at the terminal 34, the blanker circuit 36 within the visual display 27 will cause the display driver 31 to provide a blank visual display to all of the display devices 28 through 30. In response to a constant low logic signal on line 33 an activity detector will reset microprocessor A and then microprocessor B and will cause microprocessor B not to drive line 33. Therefore resistor 35 will pull latch line 33 high and blank the display. Thus, in the absence of the visual display 27 receiving latch signals on the latch line 33, a blank visual display will eventually be provided. This is desirable, since otherwise erroneous visual display readings could be generated since the existence of the latch pulses on latch line 33 are utilized by driver 31 to insure that the proper corresponding portions of the display devices 28 through 30 are excited in accordance with recent data on the data bus 25. Thus providing a blank display, which would clearly be indicative of a failure, is much more preferable than providing an erroneous display of prior data on the visual display devices 28 through 30 in the event of the microprocessor B failing to produce latch pulses on the latch line 33. Also, failure to receive latch pulses would result in no new data being received by the driver 31 and this could burn out the display devices, if the display devices were not blanked as previously described.

The output activity terminal 34 of the microprocessor B is coupled to an input terminal 37 of an activity detector 38 which comprises circuitry external to the microprocessors A and B. This is significant since it is desirable that the activity detector 38 operates essentially independently of the programming of the microprocessors A and B in determining system failures. This is because if the activity detector 38 was part of the internal programming of microprocessors A or B, then errors in the programmed operation of either of those microprocessors might also result in the activity detector failing to produce any output even though the microprocessors A and B were malfunctioning. In other words, if transient signals actually change the programming of microprocessors A or B, and the activity detector 38 was part of this programming, then the activity detector might not reliably detect erroneous operation of the microprocessors since the programming steps which implement the activity detector could also have been changed by transient signals.

The activity detector 38 essentially receives the latch pulses produced at the terminal 34, and in response to the constant receipt of these pulses provides a constant high logic output at an output terminal 39 of the activity detector 38. However, in response to the activity detector 38 determining that an absence of the latch pulses 34A at the terminal 34 has existed for at least a predetermined period of time, the activity detector 38 will produce a negative going reset pulse illustrated as the signal 40 in FIG. 1. This reset pulse will result in the resetting of the microprocessor A since the terminal 39 is connected to an input reset terminal 41 corresponding to the negative reset port of the microprocessor A.

The operation of the activity detector 38 can be readily implemented by a monostable multivibrator which produces a short duration negative pulse in response to the lack of receipt of resetting pulses which effectively constantly reset an input timer circuit before the circuit times out and generates an output pulse. In addition, there are various other implementations of the activity detector which would also work. The internal configuration of the activity detector 38 is not significant, and it can be readily implemented by those of average skill in the art to accomplish the aforesaid desired operation.

In addition to the circuit components and connections described above, the output terminal 34 of the microprocessor B is also connected as an input to the microprocessor A via a connection line 42. This connection is merely to insure that the data being transferred from the microprocessor A to the microprocessor B via the data bus 13 will be transferred at appropriate times with respect to the generation of the multiplex pulses produced at the terminal 34. This is not a substantial feature of the present invention.

Essentially, with the circuitry described above, the operation of the multiple microprocessor watchdog system 10 is as follows. After power-on has been applied and the initial reset mode of microprocessor A has been implemented, the microprocessor A will process sensor information on the data bus 15 and produce various alert and control signals on the additional output data bus 16. In addition, display data will be transferred to the microprocessor B via the data bus 13 and the data available line 18 for further processing by the microprocessor B. The microprocessor B will format this data and transfer it in a manner which will multiplex the individual displays 28–30, via the data bus and clock connections 25 and 26, to the visual display 27 which will multiplex and strobe excite the individual displays 28 through 30 to provide a visual display of this data. The strobing of the display devices 28 through 30 occurs in accordance with the activity pulses 34A produced at the activity output terminal 34 of the microprocessor B.

If the microprocessor B malfunctions such that latch pulses are no longer produced at the terminal 34, the blanker circuit 36 of the visual display 27 essentially turns off driver 31, within a predetermined time, and insures that a blank visual display is provided for the display devices 28 through 30. This insures that these display devices will not receive constant excitation, and therefore protects against the burnout of these devices. This also prevents maintaining prior visual displays no longer representative of current conditions when latch signals are not being produced. In response to the lack of latch pulses at the terminal 34, the activity detector 38 will, after a predetermined time, recognize the failure of the microprocessor B, and produce the reset signal 40. This will result in resetting the microprocessor A via a reset mode which includes generating a high logic signal at the terminal 20 that results in the resetting of the microprocessor B. After the microprocessor A has finished its reset mode, the high logic state at the terminal 20 is altered by the microprocessor A, thus releasing the microprocessor B. This insures proper synchronization between the microprocessors A and B, and also insures that the microprocessor B will not respond to transient signals produced by the microprocessor A during its reset mode since the microprocessor B is not released until after completion of the reset mode of the microprocessor A.

It is contemplated that the microprocessor B will also be able to detect when the microprocessor A has failed to provide data to the microprocessor B for a predetermined interval of time. In such an event, the microprocessor B, knowing that there is an effective failure of the data connection between the microprocessors A and B, will essentially enter a suicide mode and intentionally terminate the generation of the latch pulses 34A at the terminal 34. This, as can be seen from the preceding description, will result in the sequential resetting of the microprocessors A and B in an attempt to cure the problem which resulted in the microprocessor A failing to properly send data to the microprocessor B.

From the above description, it is clear that the activity detector 38 is actually utilized to produce appropriate reset pulses in the event of a detected failure of either the microprocessor A or the microprocessor B, and the configuration utilized by the present invention insures proper synchronous operation of the microprocessors A and B.

Additional details of the operation of the present invention will now be described in connection with the flow charts illustrated in FIGS. 2A, 2B and 3 which are representative of the programming of the microprocessors A and B. Preferably microprocessor A corresponds to a Motorola MC 6805R3 microprocessor and microprocessor B corresponds to a General Instruments PIC 1654 microprocessor.

Figure 2A:
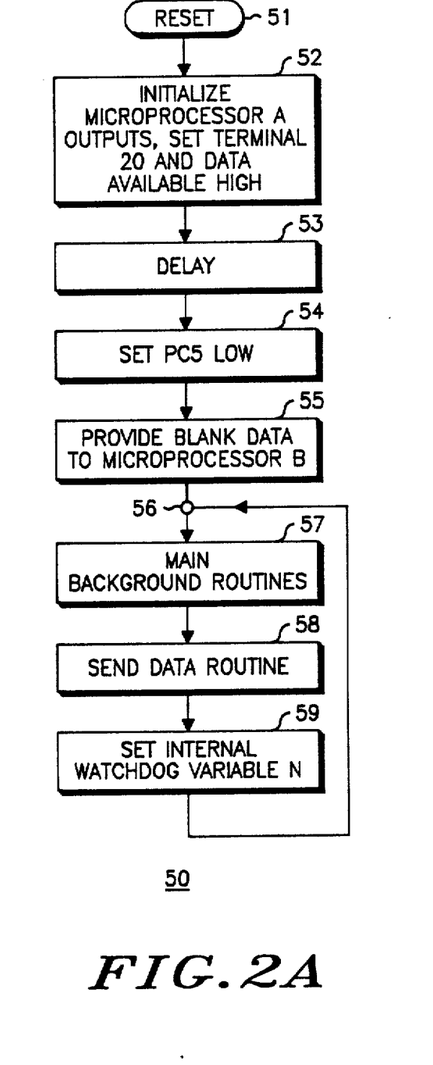
FIGS. 2A and 2B comprise flow charts representative of the programming of a microprocessor A illustrated in FIG. 1.

FIG. 2A illustrates a flow chart 50 which illustrates the reset mode of the microprocessor A and the normal functioning of the microprocessor. The flow chart 50 is entered at an initial reset step 51 wherein this step is accessed in response to each application of power to the power-on terminal 14, as well as each reset signal received at the reset terminal 41 of the microprocessor A. After the reset entry step 51, control passes to an initialization block 52 which results in initializing all of the outputs of the microprocessor A, and setting the control output terminal 20 and data available output terminal 17 of the microprocessor A high. Setting the terminal 20 high results in resetting the microprocessor B as was previously explained, and further operation of the microprocessor B is held until the terminal 20 is set low by microprocessor A.

After block 52, a delay step 53 is implemented to allow for settling of transients produced by the resetting of the microprocessor A. Then, the control terminal 20 is set low by a process block 54, and then the microprocessor A will intentionally send visual display data on the data bus 13 to the microprocessor B wherein this display data will actually be "blank" display data to insure that the initial visual display produced by display 27 will be blank. The sending of this blank display data to microprocessor B is conducted by a process block 55. The sending of this blank display data is utilized to insure a minimum of flickering of the visual display 27 in response to power supply transients. Thus for repeated short duration applications of power to the terminal 14, no visual display will be produced since this will result in multiple reset modes corresponding to the steps 51 through 55.

After process block 55, the flow chart 50 proceeds to a summing terminal 56. From this terminal, control passes to a process block 57 corresponding to the main background routines stored in the microprocessor A. These main background routines correspond to complex and time-consuming routines utilized by the microprocessor to generate not only the visual display data on the data bus 13 related to sensor input signals, but also the additional output signals provided on the bus 16. As part of the main background routines in the process block 57, periodically control will pass to a process block 58 which corresponds to the sending of data from the microprocessor A to the microprocessor B via the data bus 13. This process block essentially corresponds to providing a high logic signal at the terminal 17 which indicates to the microprocessor B that data is available for reading by the microprocessor B. Subsequently, a high to low logic transition is provided at the terminal 17 by the microprocessor A which results in the microprocessor B reading the data sent to it via the data bus 13. After the data has been sent to the microprocessor B via process block 58, control passes to process block 59 which essentially sets an internal watchdog variable N to an arbitrary number which is 1280 in the preferred embodiment of the present invention. Then control passes back to the summing terminal 56 for resuming the main background routines in the process block 57.

The preceding description of the flow chart 50 indicates that after the initial reset mode, corresponding to the blocks 51 through 55, the normal operation of the microprocessor A consists of executing a number of complex background routines, sending display information to the microprocessor B, and then setting an internal watchdog variable N to an arbitrary value of 1280, after which the main background routines in process block 57 are resumed.

Figure 2B:
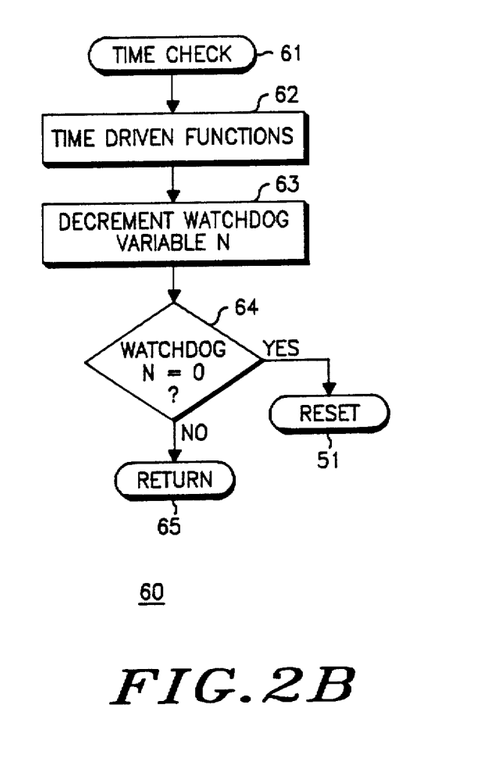

FIG. 2B illustrates a flow chart 60 which is also representative of the programming of microprocessor A in that it corresponds to a time check subroutine which is periodically executed by the microprocessor A every 1 millisecond. Thus in response to the timing out of an internal timer which occurs every 1 millisecond, the flow chart 60 is entered by the microprocessor A, which essentially interrupts its execution of the flow chart 50 and implements the steps in the flow chart 60. The entry level step for flow chart 60 is a time check entry block 61 from which control passes to a process block 62 which implements various time-driven functions. The process block 62 essentially corresponds to the microprocessor A monitoring each of the input signals on the sensor bus 15 at the 1 millisecond interval to determine their present, as opposed to previous, state. This information is used to update variables utilized in the execution of the main background routines in the process block 57 of the main flow chart 50. In addition, other time-driven functions may be implemented by the process block 62.

After the process block 62, control passes to a process block 63 which essentially decrements the watchdog variable N by 1 digit. Then control passes to a decision block 64 which inquires if the watchdog variable N has now been decremented to a zero value. If not, control passes to a return step 65 which essentially implements re-entry of the main flow chart 50 at the exact point at which the execution of the flow chart 50 was interrupted by the entry of the flow chart 60. If the decision block 64 determines that the watchdog variable N has been decremented to a zero value, then control passes to the reset entry step 51 of flow chart 50. This results in implementing the microprocessor reset mode (steps 51-55).

The watchdog variable N having a zero value is indicative of the microprocessor A taking too long of a time interval between the sequential settings of the watchdog variable N by the process block 59. In other words, it is contemplated that the flow chart 50 will result in setting the watchdog variable N to some positive integer after execution of the background routine process step 57 and the sending of data via the process block 58. If the flow chart 60 results in continually decrementing the watchdog variable N until a zero state has been achieved, then this is indicative of a failure of the process step 59 to be executed within a predetermined time interval set by the initial programming of microprocessor A, wherein this corresponds to a predetermined number (1280) of the 1 millisecond intervals implemented by the flow chart 60. In the preferred embodiment of the present invention, the variable N is set to 1280 by the process block 59. If the flow chart 60 is executed 1280 times before the process block 59 resets the variable N to 1280, then this is indicative of a failure of the microprocessor A as detected by its programmed internal watchdog timer. The result is that the microprocessor A will reset itself by executing the initial reset mode representative of the steps 51 through 55. Of course, this also results in the resetting of the microprocessor B, but again it should be noted that the effective sequential resetting of these microprocessors insures proper synchronization of the watchdog system 10.

Figure 3:
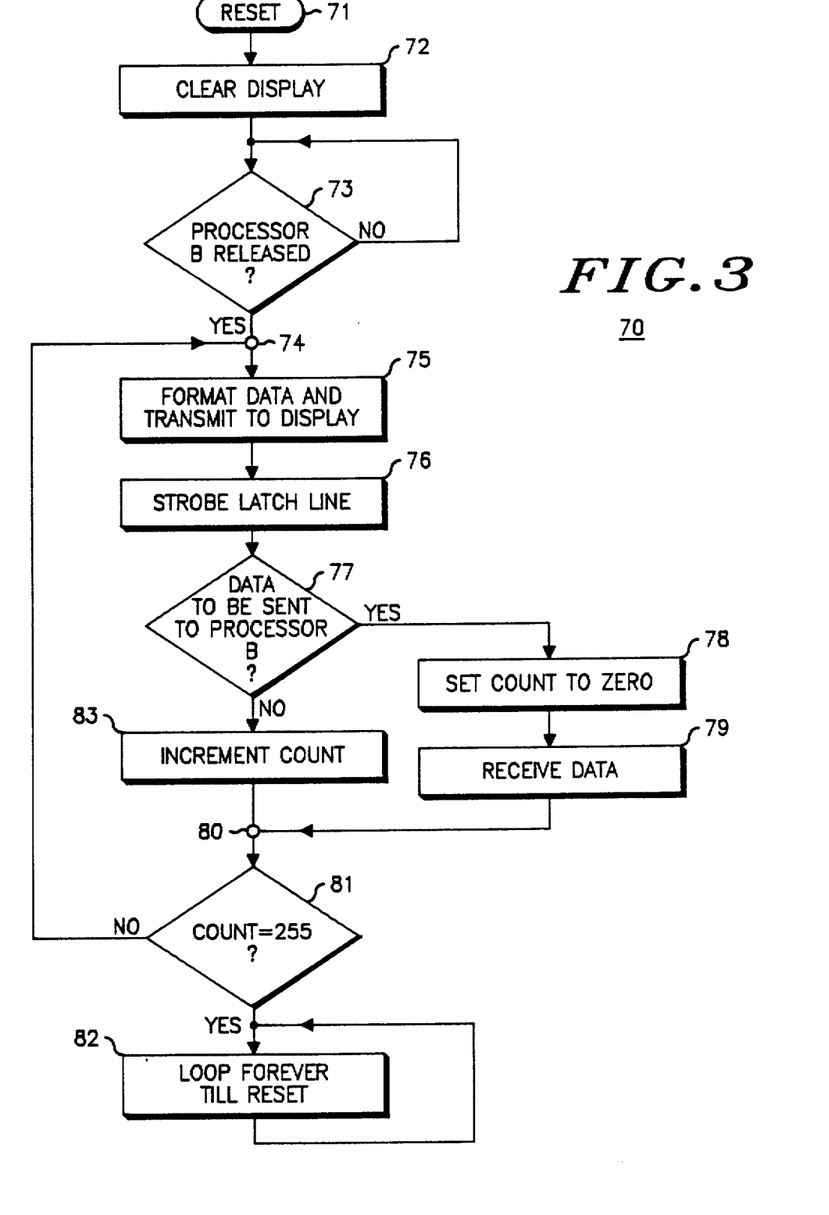
FIG. 3 comprises a flow chart representative of the programming of a microprocessor B illustrated in FIG. 1.

FIG. 3 illustrates a flow chart 70 which is indicative of the programming of the microprocessor B in FIG. 1. In response to resetting of the microprocessor B, the flow chart 70 is entered at a reset entry level step 71. Then control passes to a process block 72 which results in effectively clearing all the display registers internal to the microprocessor B, which determine the data on the data bus 25, as well as providing no latch pulses at the terminal 34 which results in blanking the visual display 27 as was previously explained. Then control passes to a decision block 73 which inquires if the microprocessor B has been released by providing a high signal at the terminal 24. If not, a loop is entered into, and no further action occurs until the microprocessor is released.

Once the microprocessor B has been released, control then passes to a summing terminal 74, and from there to a process block 75 which is representative of the operation of the microprocessor B formatting the data stored in its internal display registers and transmitting this data to the visual display 27 via the connections 25 and 26. Then control passes to a process block 76 which results in the generation of a single strobe or activity pulse at the terminal 34 which is indicative of the proper operation of the microprocessor B. Then control passes to a decision block 77 which inquires if data is to be sent to microprocessor B from microprocessor A. Essentially this is an inquiry as to the state of the data available line 18.

If the data available line 18 is high, then control passes to a process block 78 which sets a microprocessor B variable "count" to zero. Then control passes to a process block 79 which awaits the occurrence of a negative transition on the data available line 18 so that the microprocessor B will read the data present on the data bus 13. It should be noted that if no high to low logic transition occurs on the data available line 18, then control will remain at the process block 79 for an indeterminate period of time. After data has been received by the microprocessor B, control passes from the process block 79 to a summing terminal 80, and from there to a decision block 81 which determines if the variable "count" is equal to 255. If not, control passes to the summing terminal 74 for re-execution of steps 75 through 77. If the count is equal to 255, then control passes to a process block 82 which essentially implements an indefinite time period waiting function until the microprocessor B is reset. If the decision block 77 determines that there is no data which is currently to be sent to microprocessor B, wherein this is determined by looking at the state of the data available line 18, then control passes from decision block 77 to a process block 83 which will increment the variable "count" and then pass control to the summing terminal 80.

Essentially, the operation of the flow chart 70 is as follows. When the microprocessor B is reset, display registers within the microprocessor are cleared by block 72, and decision block 73 waits until the microprocessor B is released by microprocessor A. Upon release, data in the display registers in the microprocessor B is formatted and transmitted to the visual display 27, and a single latch or activity pulse is provided at the terminal 34. Then decision block 77 asks if new data is to be transmitted to the microprocessor B by the microprocessor A. If so, a variable called count is set to zero, and this data is received at the negative transition of the logic state on line 18, and re-execution of the steps 75 through 77 occurs. If per decision block 77 no data is currently to be sent to microprocessor B, then the variable count is incremented and, assuming that a count of 255 has not yet been achieved, process blocks 75 through 76 are re-executed.

It is contemplated that normally the process blocks 75 through 77 will be constantly re-executed unless a count of 255 is achieved, such that normally latch pulses at the terminal 34 will be generated very frequently. If a count of 255 is achieved, then this is indicative of the passage of a time interval of approximately $\frac{3}{4}$ of a second during which the microprocessor A has failed to send any new data to microprocessor B via the data bus 13. This is because if the microprocessor A had sent some data within a $\frac{3}{4}$ second interval, then the count variable would be set to zero, rather than being allowed to increment up to its maximum value of 255. Therefore, in response to the failure of the microprocessor A to send any new data to the microprocessor B within a $\frac{3}{4}$ of a second interval, the decision block 81 will transfer control to the wait loop 82 and implement an indefinite waiting period. During this indefinite wait, there will be no additional strobe (latch) pulses produced by the process block 76, and this will cause the activity detector 38 to respond to this absence of activity pulses and implement resetting of first the microprocessor A and then the microprocessor B.

A similar situation exists if the data available line 13 goes high and remains high without any subsequent high to low logic transition. In that case, the flow chart 70 will remain at the process block 79 since implementation of this process block, representative of the receipt of data, only occurs in response to a high to low transition of the data available line 18. Therefore, if there are no high to low transitions of the data available line 18, control remains at the process block 79 for an indefinite period of time. This again will result in the failure of the flow chart 70 to execute the process block 76 and thus effectively terminates any further generation of activity pulses at the terminal 34 until data is received by the microprocessor B. If a sufficient time interval exists before data is received according to the process block 79, then the activity detector 38 will again recognize that no activity pulses are being produced at the terminal 34, and this will result in the sequential resetting of the microprocessors A and B.

From the above description of flow chart 70, it is apparent that microprocessor B essentially monitors if microprocessor A is transferring data to it at least as frequently as every ⅛ of a second. If not, microprocessor B concludes that there is a system fault due to microprocessor A failing to provide new data to microprocessor B. In that event microprocessor B effectively enters a suicide mode by failing to produce latch pulses. This results in resetting both microprocessors in an attempt to cure the fault.

While specific embodiments of the present invention have been shown and described, further modifications and improvements will occur to those skilled in the art. Such modifications could comprise various different implementations for the blanker circuit 36 or providing additional internal watchdog programming in either the microprocessor A or the microprocessor B. However, all such modifications which retain the basic underlying principles disclosed and claimed herein are within the scope of this invention.

We claim:

1. A multiple microprocessor watchdog system comprising:

first microprocessor means A for generating output data on a first data bus and having an input reset terminal and an output control terminal, a control signal being provided at said output control terminal by said microprocessor means A in response to said microprocessor means A being reset;

second microprocessor means B coupled to said microprocessor means for receiving said data on said first data bus, processing said output data and providing said processed output data on a second data bus, said microprocessor means B having a reset input terminal, said microprocessor means B also having an activity output terminal at which activity pulses are periodically provided by said microprocessor means B, the existence of said periodic activity pulses being indicative of proper operation of said microprocessor means B;

utilization means coupled to said microprocessor means B for receiving and utilizing said processed output data on said second data bus; and activity detector means coupled to said activity output terminal of said microprocessor means B for receiving said periodic activity pulses and providing a reset signal at an output terminal of said activity detector means in response to an absence of said periodic activity pulses;

the improvement comprising, said reset output terminal of said activity detector means being coupled to the reset input terminal of said microprocessor means A, and the control output terminal of microprocessor means A being connected to the reset input terminal of microprocessor means B, wherein detected activity failures of microprocessor means B result in said reset signal provided by said activity detector means resetting microprocessor means A and said microprocessor means A then resetting microprocessor means B.

2. A multiple microprocessor watchdog system according to claim 1 wherein said microprocessor means B includes means for detecting when microprocessor means A is not properly sending data via said first data bus to microprocessor means B and, in response thereto, terminating generating said periodic activity pulses, whereby microprocessor means A and microprocessor means B are then reset.

3. A multiple microprocessor watchdog system according to claim 2 wherein said utilization means comprises a visual display means for providing visual displays indicative of said received processed output data on said second data bus.

4. A multiple microprocessor watchdog system according to claim 3 wherein said display means includes display driver means for periodically distributing said received processed output data to various separate visual display devices in said display means in accordance with multiplex signals received by said display driver means.

5. A multiple microprocessor watchdog system according to claim 4 wherein said output terminal of said microprocessor means B is effectively connected to said display means, and wherein strobe excitation of said display devices is derived from said periodic activity pulses provided at said output terminal of said microprocessor means B.

6. A multiple microprocessor watchdog system according to claim 5 wherein a blanker circuit means is provided in said display means, said blanker circuit means, in response to an absence of activity pulses at said output terminal of said microprocessor means B for a predetermined time, causes said display driver means to provide a blank visual display on said visual display devices.

7. A multiple microprocessor watchdog system according to claim 6 wherein said display devices comprise vacuum fluorescent display devices.

8. A multiple microprocessor watchdog system according to claim 2 wherein said microprocessor means A provides a data available signal, separate from said data on said data first bus, to said microprocessor means B, and wherein said microprocessor means B includes means for terminating the generation of said activity pulses in response to the absence of said data available signal for a predetermined time.

9. A multiple microprocessor watchdog system according to claim 2 wherein said microprocessor means A includes means therein for internally resetting itself in response to said microprocessor means A failing to perform expected functions within a predetermined time period.

10. A multiple microprocessor watchdog system according to claim 2 wherein said activity detector means comprises a circuit separate from said microprocessor means A and B, whereby program faults in either microprocessor means are less likely to prevent proper operation of the activity detector means.

11. A multiple microprocessor watchdog system according to claim 3 wherein said microprocessor means A is reset in response to each application of power thereto, and wherein immediately after reset said microprocessor sends predetermined initial blank visual data to said microprocessor means B to insure an initial blank visual display after power applied to microprocessor means A, whereby undesired visual display flickering can be minimized for applied power transients.

12. A multiple microprocessor watchdog system according to claim 1 wherein said microprocessor means B is effectively disabled by said control signal during the resetting of microprocessor means A to prevent microprocessor means B from responding to transient outputs of microprocessor means A during the resetting of microprocessor means A.

13. A multiple microprocessor watchdog system comprising:

first microprocessor means A for generating output data on a first data bus and having an input reset terminal and an output control terminal, a control signal being provided at said output control terminal by said microprocessor means A in response to said microprocessor means A being reset;

second microprocessor means B coupled to said microprocessor means A for receiving said data on said first data bus, processing said output data and providing said processed output data on a second data bus, said microprocessor means B having a reset input terminal, said microprocessor means B also having an activity output terminal at which activity pulses are periodically produced by said microprocessor means B as long as said microprocessor means B is operating properly, the existence of said periodic activity pulses being indicative of proper operation of said microprocessor means B;

utilization means coupled to said microprocessor means B for receiving and utilizing said processed output data on said second data bus; and activity detector means coupled to said activity output terminal of said microprocessor means B for receiving said periodic activity pulses and providing a reset signal at an output terminal of said activity detector means in response to an absence of said periodic activity pulses;

the improvement comprising, said reset output terminal of said activity detector means being coupled to the reset input terminal of said microprocessor means A, and the control output terminal of microprocessor means A being connected to the reset input terminal of microprocessor means B, wherein detected activity failures of microprocessor means B result in said reset signal provided by said activity detector means resetting microprocessor means A and said microprocessor means A then resetting microprocessor means B.

* * * * *